(12) United States Patent
Poremski et al.

(10) Patent No.: US 12,480,366 B1
(45) Date of Patent: Nov. 25, 2025

(54) EARTH CUTTING TOOL, EARTH CUTTING DEVICE, AND RELATED METHODS

(71) Applicant: Kennametal Inc., Latrobe, PA (US)

(72) Inventors: Jacob A Poremski, Latrobe, PA (US); Thomas J. Long, Greensburg, PA (US); Joshua A. Frye, Latrobe, PA (US); Kenneth J. Topka, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 18/776,495

(22) Filed: Jul. 18, 2024

(51) Int. Cl.
*E21B 10/43* (2006.01)
*B28D 1/04* (2006.01)
*B23K 101/20* (2006.01)
*B23K 103/18* (2006.01)

(52) U.S. Cl.
CPC ............. *E21B 10/43* (2013.01); *B28D 1/041* (2013.01); *B23K 2101/20* (2018.08); *B23K 2103/18* (2018.08)

(58) Field of Classification Search
CPC .......... E21B 10/02; E21B 10/04; E21B 10/48; B28D 1/041
See application file for complete search history.

(56) References Cited

U.S. PATENT DOCUMENTS

| | | | | |
|---|---|---|---|---|
| 2,326,908 A | * | 8/1943 | Williams, Jr. ........... | E21B 10/48 125/20 |
| 2,506,341 A | * | 5/1950 | Bullock .................. | E21B 10/48 175/413 |
| 2,960,312 A | * | 11/1960 | Kandle .................... | E21B 10/26 175/391 |
| 4,466,498 A | * | 8/1984 | Bardwell ................ | E21B 10/56 175/413 |
| 4,597,456 A | | 7/1986 | Ecer | |
| 2003/0193235 A1 | | 10/2003 | Sollami | |
| 2013/0105231 A1 | | 5/2013 | Oakes et al. | |
| 2014/0054951 A1 | | 2/2014 | Bookhamer et al. | |
| 2015/0035343 A1 | | 2/2015 | Ojanen | |
| 2015/0198040 A1 | | 7/2015 | Voitic et al. | |
| 2017/0342831 A1 | | 11/2017 | Weber et al. | |
| 2021/0254411 A1 | * | 8/2021 | Ishizuka ................. | E21B 10/58 |
| 2022/0106839 A1 | * | 4/2022 | Ishizuka ................. | E21B 7/20 |
| 2022/0290562 A1 | | 9/2022 | Kenno et al. | |

FOREIGN PATENT DOCUMENTS

CN 304450368 S 1/2018

OTHER PUBLICATIONS

CN 208137891 U (Song) and machine translation (Year: 2018).*
JP 2002322892 A (Endo) and machine translation (Year: 2002).*
(Continued)

*Primary Examiner* — Blake Michener
(74) *Attorney, Agent, or Firm* — John A. Wilaj, Jr.

(57) ABSTRACT

An earth cutting tool can include one or more earth cutting devices. Each earth cutting device can include a plurality of inserts positioned within a body of the cutting device. The inserts can be tapered to correspond to a tapering of pockets defined in the body to facilitate insertion and attachment of the inserts to the body to avoid cracking of the body during brazing and/or heat treatment that may occur after the inserts are positioned in the pockets.

18 Claims, 6 Drawing Sheets

(56) References Cited

OTHER PUBLICATIONS

JP 2004143780 A (Sakamoto) and machine translation (Year: 2004).*
JP 2011236644 A (Shimoitani) and machine translation (Year: 2011).*
JP 2012241459 A (Kumao) and machine translation (Year: 2012).*
JP H08333978 (Akiyoshi) and machine translation (Year: 1996).*
Kennametal, "30mm (1.18") Shank Standard," printed May 3, 2024, 5 Pages https://www.kennametal.com/us/en/products/p.43mm-170-step-shank-standard.2233633.html.
Kennametal, "43mm (1.70") Step Shank Standard," printed May 3, 2024, 3 Pages, https://www.kennametal.com/us/en/products/p.30mm-118-shank-standard.1010407.html.

* cited by examiner

EARTH CUTTING TOOL, EARTH CUTTING DEVICE, AND RELATED METHODS

FIELD OF THE INVENTION

The present invention relates to an earth cutting tool, an earth cutting device that can be utilized in such a tool, and methods for making and use of the earth cutting tool and the earth cutting device.

BACKGROUND OF THE INVENTION

Examples of cutting tool assemblies for earth working can be found in US Pat. Application Publication Nos. 2013/0105231, 20150035343, or 20170342831. Cutting tools can be configured to cut into the earth (e.g. dirt, soil, rock, etc.) or in the earth (e.g. the crust of the earth or rock formations or soil). Earth cutting tools can include drilling tools that can be used in fracking, oil exploration, or drilling for mining, petroleum, or natural gas, for example.

SUMMARY OF THE INVENTION

Due to severe operating environments, the cutting tools can be subjected to strong forces. These forces can destroy or degrade the cutting tool, which then can require replacement. This type of degradation can be exacerbated when the cutting inserts are made of a different material than the underlying body to which the cutting inserts are attached.

Cutting inserts comprised of a ceramic material, carbide, tungsten carbide, or polycrystalline diamond (PCD) can be inserted into a steel body to form a cutting tool (e.g. positioned and permanently attached, bonded, and/or retained in the steel body, etc.). We have found that the differences in the coefficients of thermal expansion between these dissimilar materials can result in cracking that may occur when the formed cutting tool is brazed and subsequently undergoes heat treatment. For example, we have found that such cracking can occur when the formed cutting tool is brazed and subsequently quenched or otherwise cooled during the manufacturing process. We have found that such cracking can occur via a brazing process (e.g. brazing, torch brazing, furnace brazing, etc.) with a subsequent heat treatment process (e.g. quenching or other type of heat treatment that can result in cooling of the joined materials, etc.). We have found that the quick cooling of the steel body and inserts can result in the steel body cracking during a quenching process, for example. We have found that this cracking can occur due to the steel body being unable to withstand the stresses that occur from the steel and insert material shrinking at different rates as the insert material and steel body cools during the brazing and/or subsequent heat treatment.

We have developed a cutting tool and method of making a cutting tool that can avoid such manufacturing defects and help provide a stronger tool with a better bond, or connection, between inserts and a steel body to which the inserts are attached. Embodiments can provide a more reliably formed cutting tool that has improved ability to withstand operational environments so that the tool that is formed can provide improved durability and a longer life of the cutting tool.

In some embodiments, the cutting tool can include a base body that is formed of steel that has a plurality of pockets defined into the body. Each pocket can have an outer mouth at the outer surface of the body and be tapered to a pocket bottom that can be an innermost portion of the pocket within the steel body. The tapered pocket can extend linearly from the outer mouth to the pocket bottom so the sidewall of the pocket that extends from the pocket bottom to the outer mouth extends continuously and linearly along a pre-defined angle from the pocket bottom to the outer mouth. A tapered cutting insert can be inserted into each pocket so that there is a respective insert of a plurality of inserts in each pocket. The tapered insert can have a bottom that is narrower than its top and can have a sidewall that extends from its bottom to its top continuously along the pre-defined angle to correspond with the tapering of the pocket to which it is positioned. The upper portion of the insert can project from the steel body and can be positioned to directly contact earth for cutting of the earth.

The inserts can be positioned in the pockets via a brazing operation. In some embodiments, the steel body and/or inserts can each be heated to a pre-selected brazing temperature and the inserts can subsequently be inserted into the pockets. After insertion, the formed cutting tool that is at a pre-selected brazing temperature can be placed into a bath of liquid (e.g. oil, water, a quenching liquid, etc.) to be quickly cooled to a pre-selected quenching temperature. Thereafter, the formed cutting tool can undergo other post quenching processing (e.g. undergo a heat treatment, undergo machining of the steel body, etc.) as may be needed to finish the formed cutting tool. In some embodiments, for example, the formed cutting tool may be inserted or attached into a mounting body to facilitate mounting of the cutting tool to a rotatable body that can be rotated to effect cutting of earth to form bores or other types of apertures in the earth to facilitate fracking or other type of drilling into the earth.

The sizing of the inserts and pockets can be configured to facilitate use of an intermediate brazing material in some embodiments to help facilitate the insertion and connection of the inserts to the pockets. In other embodiments, no such intermediate material may be needed.

The sizing of the inserts and pockets can also be provided such that the bottom of each insert is spaced from the pocket bottom to facilitate an escape of gas that may occur during the brazing process.

In a first aspect, a cutting tool is provided. Embodiments of the cutting tool can include a shaft having a first end and a second end. The shaft can be rotatable in a first rotational direction (e.g. a clockwise direction or a counterclockwise direction). A plurality of cutting devices can be attached to the first end of the shaft. Each of the cutting devices can include a body having a top side and a bottom side. The top side can be opposite the bottom side. The bottom side can be positioned adjacent to the first end of the shaft and the top side can be further away from the first end of the shaft than the bottom side. The body can also have a plurality of sidewalls that extend between the bottom side and the top side. The plurality of sidewalls can include a first end wall and a second end wall that is opposite the first end wall. The first end wall can extend from a first end of the bottom side to a first end of the top side and the second end wall can extend from a second end of the bottom side to a second end of the top side. The plurality of sidewalls of the body can also include an outer peripheral side facing sidewall and an inner peripheral side facing sidewall. The outer peripheral side facing sidewall can extend between the top side and the bottom side and also extend between the first end wall and the second end wall. The inner peripheral side facing sidewall can be opposite the outer peripheral side facing sidewall. The inner peripheral side facing sidewall can extend between the top side and the bottom side and also extend between the first end wall and the second end wall.

The body of the each cutting device can include a plurality of pockets defined therein. The plurality of pockets can include at least one first pocket, at least one second pocket, and at least one third pocket. Each of the pockets can be defined to have a mouth in an outer surface of the body, a bottom defined inside the body, and at least one pocket sidewall extending linearly and continuously from the bottom of the pocket to the mouth of the pocket at a pre-selected angle such that the mouth of the pocket is wider than the bottom of the pocket. The top side of the body can have the at least one first pocket defined therein, the outer peripheral side facing sidewall can have the at least one second pocket defined therein; and the inner peripheral side facing sidewall can have the at least one third pocket defined therein.

A plurality of inserts can be included in the body. For example, the inserts can include at least one first insert having an inner portion affixed within the at least one first pocket and an outer portion extending from the at least one first pocket, at least one second insert having an inner portion affixed within the at least one second pocket and an outer portion extending from the at least one second pocket, and at least one third insert having an inner portion affixed within the at least one third pocket and an outer portion extending from the at least one third pocket.

In some embodiments, the inserts can be comprised of a material that is harder than the material of the body. For example, the body can be comprised of steel and the inserts can be comprised of a ceramic material, a carbide material, PCD material, or tungsten carbide material.

In a second aspect, the outer portion of the first insert can be wider than the inner portion of the first insert, the outer portion of the second insert can be wider than the inner portion of the second insert, and the outer portion of the third insert can be wider than the inner portion of the third insert.

In a third aspect, each of the inserts has at least one sidewall that extends from an inner end of the insert to the mouth of the pocket in which the insert is positioned along the at least one pocket sidewall of the pocket in which the insert is positioned for being affixed within the pocket to which the insert is positioned. For example, the first insert positioned in the first pocket can have a sidewall that extends from its inner end to the mouth of the first pocket along a pocket sidewall of the first pocket, the second insert positioned within the second pocket can have a sidewall that extends from its inner end to the mouth of the second pocket along a pocket sidewall of the second pocket, and the third insert positioned within the third pocket can have a sidewall that extends from its inner end to the mouth of the third pocket along a pocket sidewall of the third pocket.

In some embodiments, each of the of the inserts has at least one sidewall that extends from the inner end of the insert to the mouth of the pocket in which the insert is positioned at the pre-selected angle. In some embodiments, the pre-selected angle can be between 10° and 60°. For instance, the sidewall of the first insert can extend from its inner end to the mouth of the first pocket at an angle of between 10° and 60°, the sidewall of the second insert can extend from its inner end to the mouth of the second pocket at an angle of between 10° and 60°, and the sidewall of the third insert can extend from its inner end to the mouth of the third pocket at an angle of between 10° and 60°.

In a fourth aspect, for each of the inserts, a joint can be defined between the at least one sidewall of the insert that extends from the inner end of the insert to the mouth of the pocket in which the insert is positioned and the at least one pocket sidewall of the pocket in which the insert is positioned. In some embodiments, the joint can include a brazing material. For example, the first insert positioned in the first pocket can have a sidewall that extends from its inner end to the mouth of the first pocket along a pocket sidewall of the first pocket and there can be a first joint between the sidewall of the first insert and the pocket sidewall of the first pocket, the second insert positioned within the second pocket can have a sidewall that extends from its inner end to the mouth of the second pocket along a pocket sidewall of the second pocket and there can be a second joint between the sidewall of the second insert and the pocket sidewall of the second pocket, and the third insert positioned within the third pocket can have a sidewall that extends from its inner end to the mouth of the third pocket along a pocket sidewall of the third pocket and there can be a third joint between the sidewall of the third insert and the pocket sidewall of the third pocket.

In a fifth aspect, there can be a gap between the inner end of the insert positioned within the pocket and a bottom of the pocket for each of the pockets. For example, the first insert positioned in the first pocket can have its inner end spaced from a bottom of the first pocket by a first gap, the second insert positioned within the second pocket can have its inner end spaced from a bottom of the second pocket by a second gap, and the third insert positioned within the third pocket can have its inner end spaced from the bottom of the third pocket by a third gap.

In a sixth aspect, the first end wall of the body has no inserts and the second end wall of the body has no inserts.

In a seventh aspect, the shaft can have a chamber in communication with a mouth defined in the first end of the shaft.

In an eighth aspect, the size and shape of the body and the size and shape of the inserts can be adapted for a pre-selected set of design criteria. For example, the body can be polygonal shaped or have another type of shape and the inserts can include an outer portion that has a pre-selected shaped to facilitate a cutting profile for a pre-selected set of design criteria.

In a ninth aspect, the earth cutting tool of the first aspect can include one or more features of the second aspect, third aspect, fourth aspect, fifth aspect, sixth aspect, seventh aspect and/or eighth aspect. Embodiments can also include other elements or features. Examples of such other elements or features can be appreciated from the exemplary embodiments discussed herein, for instance.

In a tenth aspect, a cutting device for being connected to a distal end of a rotatable shaft of an earth cutting tool is provided. The cutting device can include a body comprised of metal. The body can have a top side and a bottom side. The top side can be opposite the bottom side. The bottom side can be positionable adjacent to the distal end of the rotatable shaft. The body can also have plurality of sidewalls that extend between the bottom side and the top side. The sidewalls can include a first end wall and a second end wall that is opposite the first end wall. The first end wall can extend from a first end of the bottom side to a first end of the top side and the second end wall extending from a second end of the bottom side to a second end of the top side.

The plurality of sidewalls of the body can also include an outer peripheral side facing sidewall and an inner peripheral side facing sidewall. The outer peripheral side facing sidewall can extend between the top side and the bottom side and also extend between the first end wall and the second end wall. The inner peripheral side facing sidewall can be opposite the outer peripheral side facing sidewall. The inner peripheral side facing sidewall can extend between the top side and the bottom side and also extend between the first end wall and the second end wall.

The body can also have a plurality of pockets defined therein. The plurality of pockets can include at least one first pocket, at least one second pocket, and at least one third pocket. Each of the pockets can be defined to have a mouth in an outer surface of the body, a bottom defined inside the body, and at least one pocket sidewall extending linearly and continuously from the bottom of the pocket to the mouth of the pocket at a pre-selected angle such that the mouth of the pocket is wider than the bottom of the pocket. The top side can have the at least one first pocket defined therein, the outer peripheral side facing sidewall can have the at least one second pocket defined therein, and the inner peripheral side facing sidewall can have the at least one third pocket defined therein.

A plurality of inserts comprised of a material that has a different coefficient of thermal expansion than a coefficient of thermal expansion of the metal of the body can also be included. The plurality of inserts can include at least one first insert having an inner portion affixed within the at least one first pocket and an outer portion extending from the at least one first pocket, at least one second insert having an inner portion affixed within the at least one second pocket and an outer portion extending from the at least one second pocket, and at least one third insert having an inner portion affixed within the at least one third pocket and an outer portion extending from the at least one third pocket.

In some embodiments, the inserts can be comprised of a material that is harder than the material of the body. For example, the body can be comprised of steel and the inserts can be comprised of a ceramic material, a carbide material, PCD material, or tungsten carbide material.

In an eleventh aspect, each of the inserts can have at least one sidewall that extends from an inner end of the insert to the mouth of the pocket in which the insert is positioned along the at least one pocket sidewall of the pocket in which the insert is positioned for being affixed within the pocket to which the insert is positioned. In some embodiments, the pre-selected angle is between 10° and 60°.

For example, the sidewall of the first insert can extend from its inner end to the mouth of the first pocket at an angle of between 10° and 60°, the sidewall of the second insert can extend from its inner end to the mouth of the second pocket at an angle of between 10° and 60°, and the sidewall of the third insert can extend from its inner end to the mouth of the third pocket at an angle of between 10° and 60°.

In some embodiments, for each of the inserts a joint can be defined between the at least one sidewall of the insert that extends from the inner end of the insert to the mouth of the pocket in which the insert is positioned and the at least one pocket sidewall of the pocket in which the insert is positioned. In some embodiments, the joint can include a brazing material. For example, the first insert positioned in the first pocket can have a sidewall that extends from its inner end to the mouth of the first pocket along a pocket sidewall of the first pocket and there can be a first joint between the sidewall of the first insert and the pocket sidewall of the first pocket, the second insert positioned within the second pocket can have a sidewall that extends from its inner end to the mouth of the second pocket along a pocket sidewall of the second pocket and there can be a second joint between the sidewall of the second insert and the pocket sidewall of the second pocket, and the third insert positioned within the third pocket can have a sidewall that extends from its inner end to the mouth of the third pocket along a pocket sidewall of the third pocket and there can be a third joint between the sidewall of the third insert and the pocket sidewall of the third pocket.

In a twelfth aspect, there can be a gap between the bottom of the pocket and an inner end of the insert positioned in the pocket. For example, the first insert positioned in the first pocket can have its inner end spaced from a bottom of the first pocket by a first gap, the second insert positioned within the second pocket can have its inner end spaced from a bottom of the second pocket by a second gap, and the third insert positioned within the third pocket can have its inner end spaced from the bottom of the third pocket by a third gap.

In a thirteenth aspect, the cutting device of the tenth aspect can include one or more features of the eleventh aspect and/or the twelfth aspect. Embodiments can also include other features or elements. Examples of such additional features or elements can be appreciated from the discussion of exemplary embodiments of the cutting device provided herein, for instance.

In a fourteenth aspect, a method of forming a cutting device is provided. Embodiments of the method can include providing a body comprised of metal. The body can have a top side opposite a bottom side, an outer peripheral facing sidewall extending from the bottom side to the top side, and an inner peripheral side facing sidewall opposite the outer peripheral facing sidewall. The inner peripheral side facing sidewall can extend from the bottom side to the top side. The body can also have a plurality of pockets including at least one first pocket defined in the top side of the body, at least one second pocket defined in the outer peripheral side facing sidewall, and at least one third pocket defined in the inner peripheral side facing sidewall. Each of the pockets can have a bottom, a mouth defined in an outer surface of the body, and at least one sidewall extending linearly from the bottom of the pocket to the mouth of the pocket at a pre-selected angle such that the mouth of the pocket is wider than the bottom of the pocket.

The method can also include positioning inserts into the pockets of the body such that the an inner end of each insert is spaced apart from the bottom of the pocket into which the insert is positioned and at least one sidewall of the insert extends from the inner end of the insert along the at least one sidewall of the pocket to the mouth of the pocket, and an outer portion of the insert extends away from the body. Each insert can be comprised of a material having a coefficient of thermal expansion that is different than a coefficient of thermal expansion of the metal of the body.

The method can also include heating the body having the inserts positioned in the pockets to a pre-selected brazing temperature and applying a heat treatment to the body having the inserts positioned within the pockets to form the cutting device.

In some embodiments, the inserts can include at least one first insert having an inner portion affixed within the at least one first pocket and an outer portion extending from the at least one first pocket, at least one second insert having an inner portion affixed within the at least one second pocket and an outer portion extending from the at least one second pocket, and at least one third insert having an inner portion affixed within the at least one third pocket and an outer portion extending from the at least one third pocket. The sidewall of the first insert can extend from its inner end to the mouth of the first pocket at an angle of between 10° and 60°, the sidewall of the second insert can extend from its inner end to the mouth of the second pocket at an angle of between 10° and 60°, and the sidewall of the third insert can extend from its inner end to the mouth of the third pocket at an angle of between 10° and 60°.

In a fifteenth aspect, the method can include applying a brazing material onto the inserts and/or into the pockets before the inserts are positioned into the pockets. In some embodiments, the brazing material can be applied for forming joints between the inserts and the pockets. For example, In some embodiments, for each of the inserts a joint can be defined between the at least one sidewall of the insert that extends from the inner end of the insert to the mouth of the pocket in which the insert is positioned and the at least one pocket sidewall of the pocket in which the insert is positioned. In some embodiments, the joint can include a brazing material. For example, a first insert positioned in the first pocket can have a sidewall that extends from its inner end to the mouth of the first pocket along a pocket sidewall of the first pocket and there can be a first joint between the sidewall of the first insert and the pocket sidewall of the first pocket, the second insert positioned within the second pocket can have a sidewall that extends from its inner end to the mouth of the second pocket along a pocket sidewall of the second pocket and there can be a second joint between the sidewall of the second insert and the pocket sidewall of the second pocket, and the third insert positioned within the third pocket can have a sidewall that extends from its inner end to the mouth of the third pocket along a pocket sidewall of the third pocket and there can be a third joint between the sidewall of the third insert and the pocket sidewall of the third pocket.

In a sixteenth aspect, the applying of the heat treatment to the body having the inserts positioned within the pockets to form the cutting device includes positioning the body having the inserts positioned within the pockets into a quenching liquid retained in a bath to quench the body and the inserts for a pre-selected quenching time period. The quenching liquid can include oil or other suitable liquid that can be kept at a pre-selected quenching liquid temperature for some embodiments. The pockets of the body can be sized and configured to prevent cracking when the body having the inserts positioned within the pockets is positioned in the quenching liquid for the pre-selected quenching time period.

In some embodiments, the body having the inserts positioned within the pockets is moved into the quenching liquid to solidify a brazing of the body and the inserts to retain the inserts within the pockets. Such brazing solidification can result in formation of joints between the inserts and the pockets, for instance.

In a seventeenth aspect, the positioning of the inserts in the pockets can be performed so that for each of the inserts that is positioned into a respective one of the pockets, a joint is formed at an interface between the at least one sidewall of the insert and the at least one sidewall of the pocket.

In an eighteenth aspect, the applying of the heat treatment to the body having the inserts positioned within the pockets to form the cutting device can include cooling the body having the inserts positioned within the pockets. The pockets can be defined in the body to prevent cracking when the body having the inserts positioned within the pockets is cooled via the applying of the heat treatment.

In a nineteenth aspect, embodiment of the process can be implemented to form an embodiment of the cutting device. Embodiments of the process can also include other steps or features. For example, the method of the fourteenth aspect can include one or more features or elements of the fifteenth aspect, sixteenth aspect, seventeenth aspect, and/or eighteenth aspect. Embodiments can also include other processing steps or features as well.

These and other embodiments shall be described in more detail herein and in the drawings that show exemplary embodiments. Therefore, other details, objects, and advantages of will become apparent as the following description of certain present preferred embodiments thereof and certain present preferred methods of practicing the same proceeds.

BRIEF DESCRIPTION OF THE DRAWINGS

Exemplary embodiments of an earth cutting tool, an earth cutting device of an earth cutting tool, and methods of making and using the same are shown in the accompanying drawings. It should be appreciated that like reference numbers used in the drawings may identify like components.

DESCRIPTION

Figure 1:
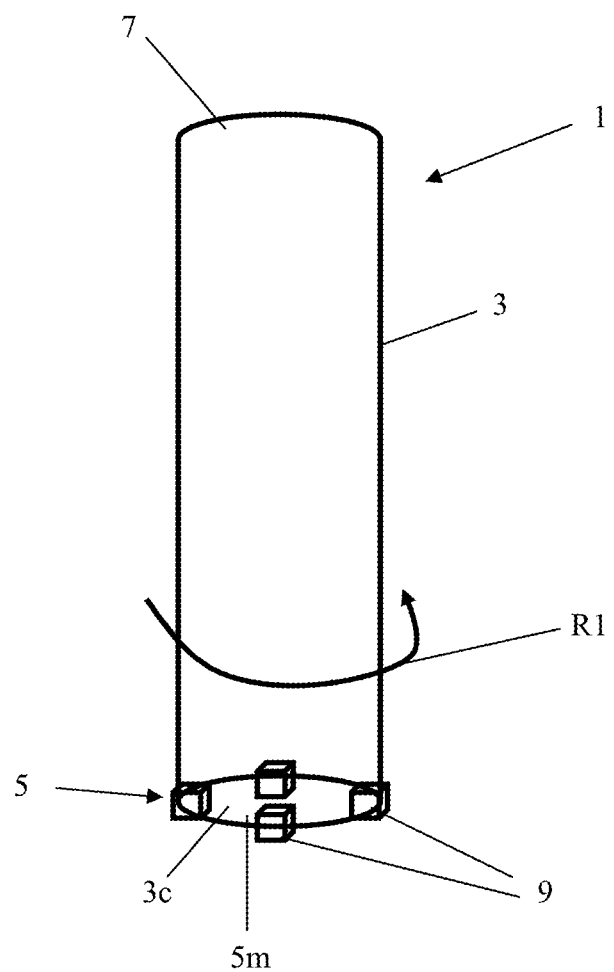
FIG. 1 is a block diagram illustrating a first exemplary embodiment of the earth cutting tool.

Referring to FIG. 1 through FIG. 5, an earth cutting tool 1 can be configured to be moved for cutting into the earth. Some embodiments can be configured so that a shaft 3 (e.g. a hollow shaft 3 or tubular shaft 3) can be rotated in a first rotational direction R1 for cutting into earth to drill into the earth to facilitate fracking or oil exploration or other types of drilling applications. The cutting tool 1 can be coupled to a drive mechanism (not shown) to drive rotation of the shaft 3 of the cutting tool 1 to cut into the earth and form an aperture into the earth (e.g. a bore, a well, etc.).

The cutting tool 1 can have a shaft 3 that has a first end 5 and a second end 7. The first end 5 can be considered a distal end that is configured to cut into the earth. The second end 7 can be considered a proximate end that can be configured for coupling to a drive mechanism or other element. The shaft can include a central chamber therein 3c. In some embodiments, the chamber can extend from a mouth 5m defined at the first end 5 so that the chamber 3c extends through the length of the shaft 3 from the mouth 5m to the second end 7 of the shaft 3. The hollow chamber can facilitate the motion of cut earth from the first end 5 to the second end 7 as the shaft is rotated while the first end 5 is in contact with the earth for drilling or otherwise cutting into the earth.

The first end 5 of the shaft 3 can have a plurality of cutting devices 9 attached to the fist end. Each cutting device can be configured to include one or more inserts 11 that can project from a body 10 of the cutting device 9 for contacting the earth so that rotation of the device can result in cutting the earth to drill or otherwise cut the earth.

Figure 2:
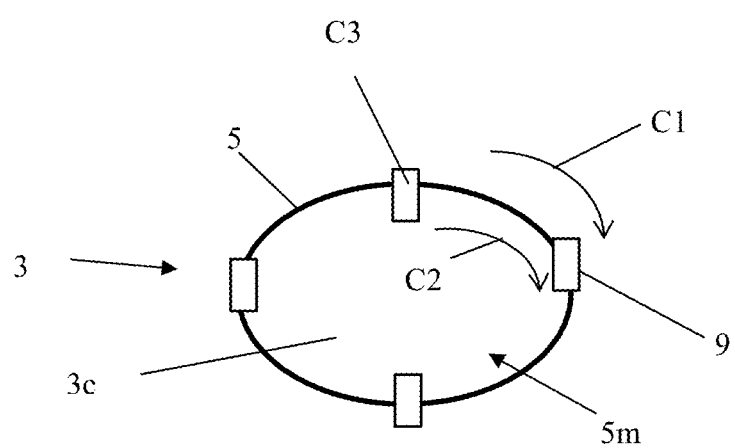
FIG. 2 is a schematic illustration of the first exemplary embodiment of the earth cutting tool from a distal end configured to cut into the earth via movement of the cutting tool (e.g. rotation).

The rotation of the shaft 3 in a first rotational direction R1 can result in each of the cutting devices 9 being rotated to cut the earth along three different sides of the first end 5 of the shaft. For example, an outer facing side of each cutting device 9 can directly contact earth along an outer periphery of the first end 5 of the shaft 3 for cutting into the earth in a first cutting direction C1 as shown in FIG. 2. An inner facing side of each cutting device 9 can directly contact earth along an inner periphery of the first end 5 of the shaft 3 that faces toward the chamber 3*c* of the shaft for cutting into the earth in a second cutting direction C2 as shown in FIG. 2. An outer face of each cutting device 9 can be a downwardly facing side of the cutting device that directly contacts the earth for cutting the earth in a third cutting direction C3 (e.g. a downward direction). For instance, the third cutting direction can be a downward direction when the shaft 3 is rotated to drill into the earth and the first and second cutting directions C1 and C2 can be opposite inner and outer circumferential sides of the shaft 3 that are above the lower third cutting direction C3 that is at a distal end of the first end 5 of the shaft 3.

The first end of the shaft 3 can include a plurality of different mounts for connection with the different cutting devices to the first end 5. In some embodiments, the mounting of the different cutting devices 9 can be provided via welding, fasteners, mounting devices, or a combination of such attachment mechanisms. The cutting devices 9 can be mounted to the first end such that the inserts 11 of the cutting devices protrude in one or more different directions—(a) inwardly into the chamber 3*c*, (b) outwardly away from the shaft 3, and/or (c) outwardly, away from the first end 5. In some preferred embodiments, the inserts 11 protrude in all three of these different directions.

Each of the cutting devices 9 can include a body 10 that can be comprised of steel. The body 10 can be formed to have any type of desired geometry. In some embodiments, the body 10 can include a top side 10*c* that is opposite a bottom side 10*d*. The top side 10*c* can be configured to be facing in the third cutting direction C3 when the cutting device 9 is mounted to the shaft 3. The bottom side 10*d* can be configured to face toward the first end 5 of the shaft 3 when the cutting device 9 is mounted to the shaft 3.

The body 10 can also include a plurality of sidewalls that extend between the bottom side 10*d* and the top side 10*c*. These sidewalls can include a first end wall 10*e* and a second end wall 10*f* that is opposite the first end wall 10*e*. The first and second end walls 10*e*, 10*f* may not include any inserts positioned therein. The first end wall 10*e* can extend from a first end of the bottom side 10*d* to the first end of the top side 10*c*. The second end wall 10*f* can extend from the second end of the bottom side 10*d* to the second end of the top side 10*c*. The first end wall 10*e* can face a first rotational direction R1 in which the shaft 3 is rotated and the second end wall 10*f* can face the opposite direction. Alternatively, the second end wall 10*f* can face the first rotational direction in which the shaft 3 is rotated and the first end wall 10*e* can face the opposite direction.

The sidewalls of the body 10 can also include an outer peripheral side facing sidewall 10*a* and an inner peripheral side facing sidewall 10*b*. The inner peripheral side facing sidewall 10*b* can face inwardly toward the mouth 5*m* of the first end 5 and/or the chamber 3*c* of the shaft 3 when the cutting device 9 is mounted to the first end 5 of the shaft 3. The outer peripheral facing sidewall 10*a* can be on the side of the body 10 that is opposite the inner peripheral side facing sidewall 10*b* to face toward earth that can be around an outer periphery, or circumference, of the first end 5 of the shaft 3.

The inner peripheral side facing sidewall 10*b* can have a proximate end that is adjacent or at an inner side of the bottom side 10*d* and can extend to its distal end that is adjacent to or at the inner side of the top side 10*c* of the body.

The outer peripheral side facing sidewall 10*a* can have a proximate end that is adjacent or at an outer side of the bottom side 10*d* and can extend to its distal end that is adjacent to or at the outer side of the top side 10*c* of the body.

In some embodiments, cutting device 9 can be formed so that the top side 10*c* of the body 10 has a plurality of inserts 11, the outer peripheral side facing sidewall 10*a* of the body 10 has at least one insert 11 (e.g. a single insert 11, two inserts 11, or more than two inserts 11), and the inner peripheral side facing sidewall 10*b* of the body 10 has at least one insert 11 (e.g. just a single insert 11, two inserts 11, or more than two inserts 11). For example, there can be at least one first pocket 12 defined in the top side 10*c* of the body 10 to receive at least one first insert therein, at least one second pocket 12 defined in the outer peripheral side facing sidewall 10*a* of the body 10 to receive at least one second insert therein, and at least one third pocket defined in the inner peripheral side facing sidewall 10*b* of the body 10 to receive at least one third insert therein.

For example, the body 10 can have a plurality of pockets 12 including at least one first pocket defined in the top side 10*c* of the body, at least one second pocket 12 defined in the outer peripheral side facing sidewall 10*a*, and at least one third pocket defined in the inner peripheral side facing sidewall 10*b*. Each of the pockets 12 can have a bottom 12*b*, a mouth 12*m* defined in an outer surface 10*o* of the body 10, and at least one sidewall 12*c* extending linearly from the bottom 12*b* of the pocket 12 to the mouth 12*m* of the pocket 12 at a pre-selected angle such that the mouth 12*m* of the pocket 12 is wider than the bottom 12*b* of the pocket 12.

Inserts can be positioned in the pockets 12 such that at least one first insert 11 is positioned in at least one first pocket 12 of the top side 10*c* of the body, at least one second insert 11 is positioned in at least one second pocket 12 of the outer peripheral side facing sidewall 10*a*, and at least one third insert 11 is positioned in at least one third pocket 12 of the inner peripheral side facing sidewall 10*b* such that the an inner end 11*e* of each insert 11 is spaced apart from the bottom 12*b* of the pocket 12 into which the insert 11 is positioned and at least one sidewall 11*w* of the insert 11 extends from the inner end 11*e* of the insert 11 along the at least one sidewall 12*c* of the pocket 12 to the mouth 12*m* of the pocket. An outer portion 11*p* of the insert 11 can extend away from the body 10 to contact with earth to cut the earth. The insert 11 can be comprised of a material having a coefficient of thermal expansion that is different than a coefficient of thermal expansion of the metal of the body 10 (e.g. the body 10 can be steel and the inserts can be comprised of a ceramic material, a carbide material, PCD material, or tungsten carbide material, etc.).

Figure 3:
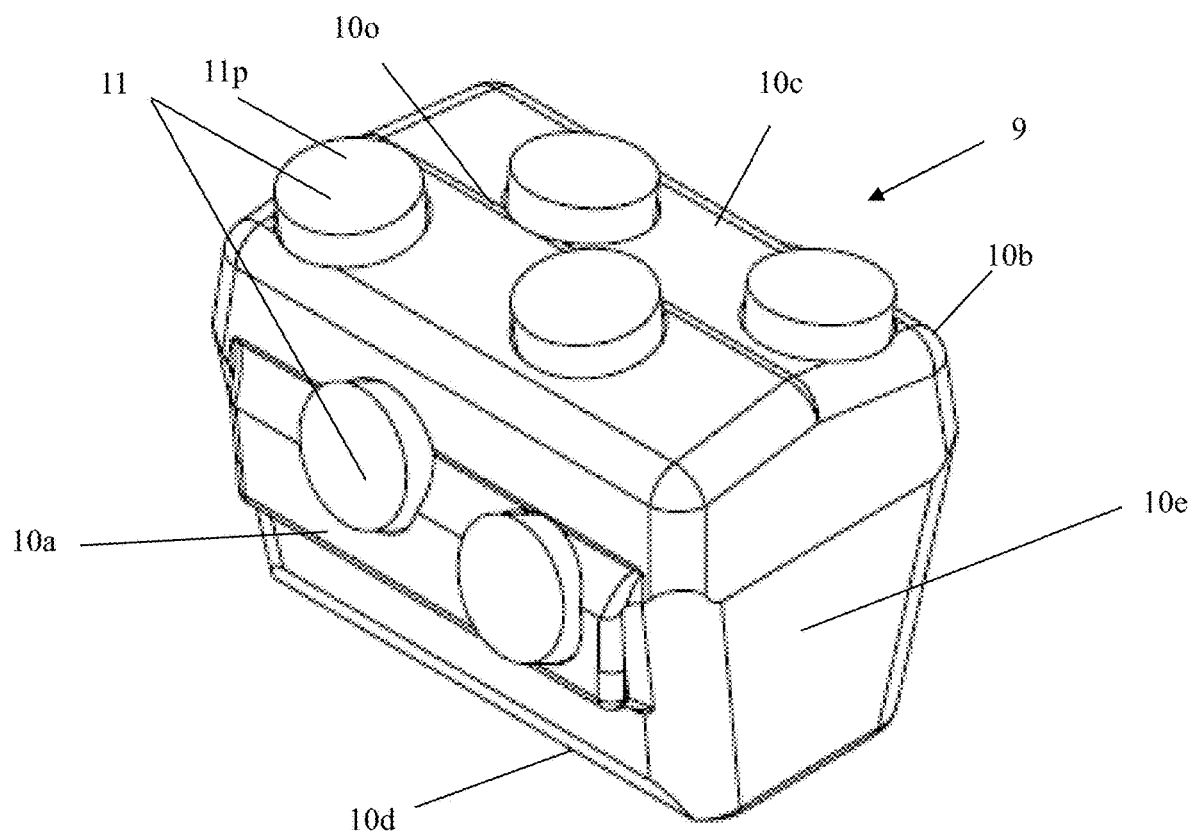
FIG. 3 is a perspective view of an exemplary embodiment of an earth cutting device 9 of the first exemplary embodiment of the earth cutting tool.
Figure 4:
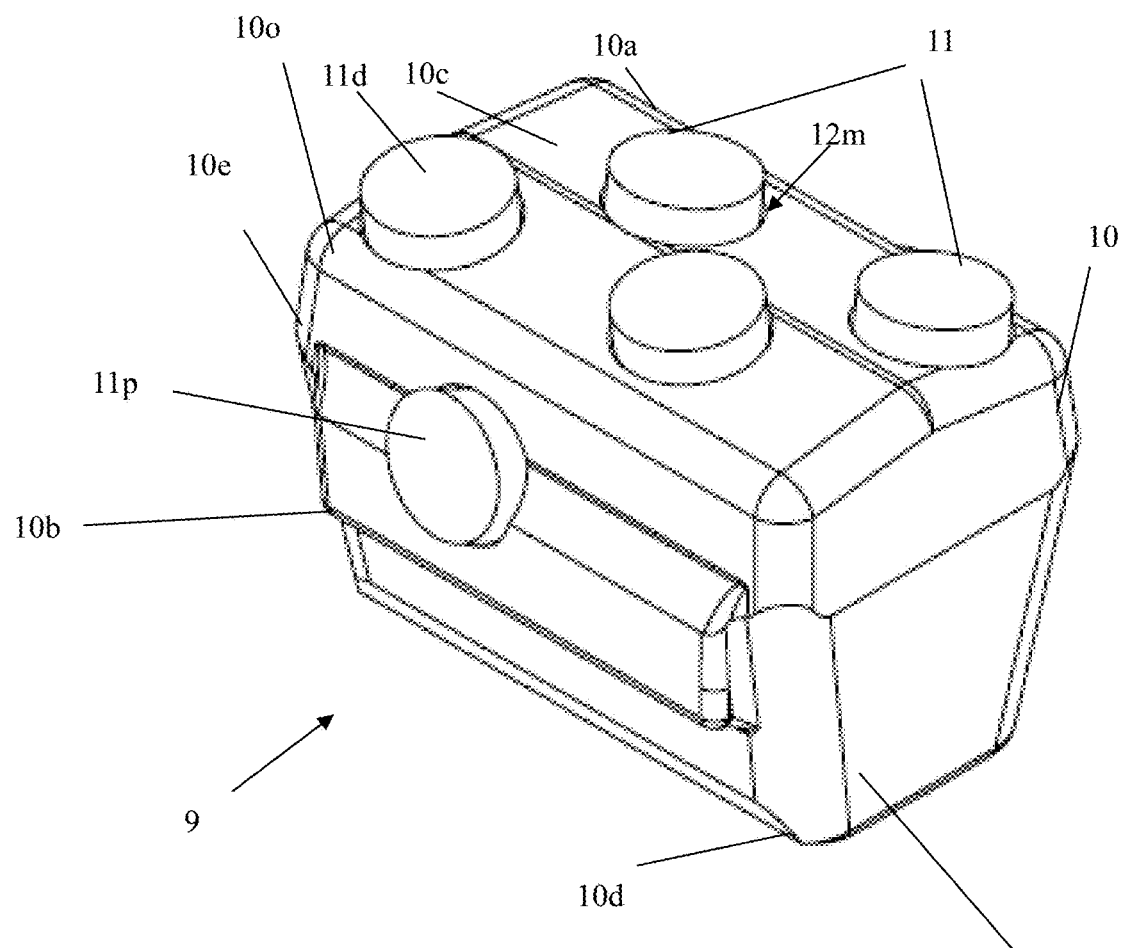
FIG. 4 is another perspective view of the exemplary embodiment of an earth cutting device 9 illustrated in FIG. 3.
Figure 5:
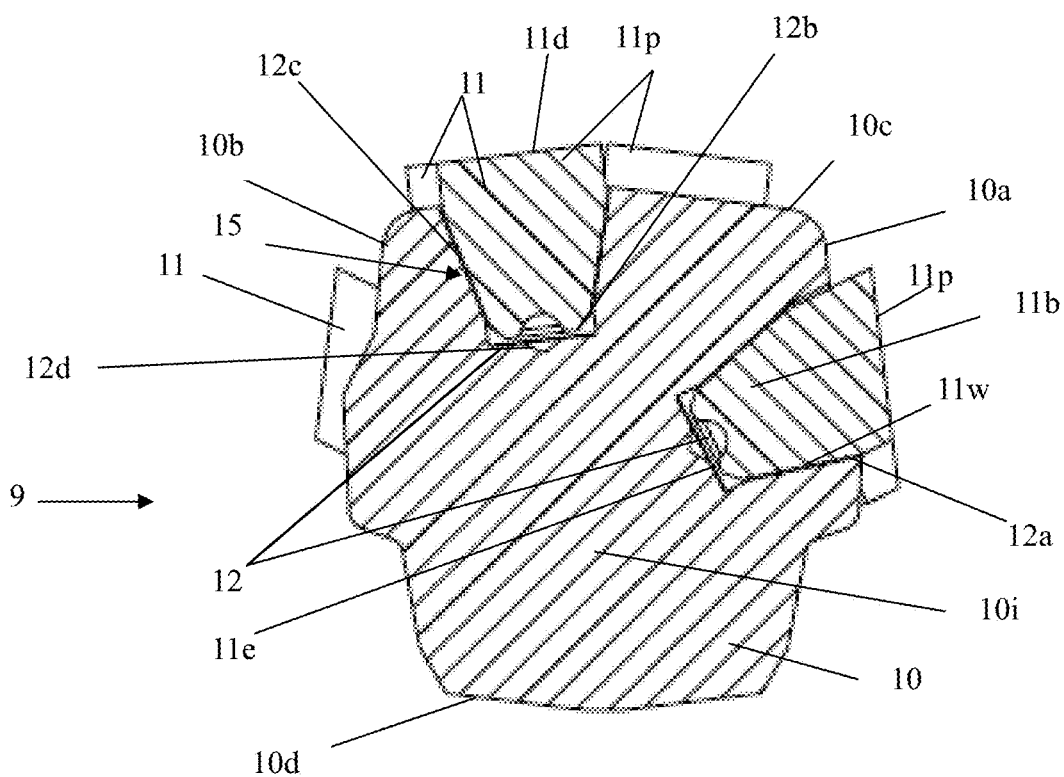
FIG. 5 is a cross-sectional view of the exemplary embodiment of an earth cutting device 9 illustrated in FIG. 3 and FIG. 4.

For example, as may best be appreciated from FIG. 3, FIG. 4, and FIG. 5, the top side 10*c*, outer peripheral side facing sidewall 10*a* and/or inner peripheral side facing sidewall 10*b* of the body 10 can have one or more pockets 12 defined therein for receipt and retention of inserts 11. Each pocket 12 can receive a respective insert 11. Each pocket 12 can be defined in the body 10 so that the pocket 12 has a bottom 12*b* that as an innermost portion of the pocket within the core 10*i* of the body (e.g. inner portion of body), and a mouth 12*m* at the outer surface 10*o* of the body 10. Each pocket 12 can be defined by a continuous sidewall 12*c* that can extend from the pocket bottom 12*b* to an outer end 12*a* of the pocket 12 at the outer surface 10*o* of the body 10 to define the mouth 12*m* of the pocket 12. The sidewall 12*c* can be sized and shaped to define a tapered shape of the pocket so that the wall 12c extends linearly and continuously along a pre-selected angle from the pocket bottom 12b to the outer end 12a.

In some embodiments, each of the pockets 12 can be sized and shaped to have multiple sidewalls 12c that are positioned to define a pocket 12 having a polygonal cross-sectional shape (e.g. hexagonal, octagonal, etc.) that is tapered. In such a configuration, each sidewall 12c can extend linearly and continuously along a pre-selected angle from the pocket bottom 12b to the outer end 12a to define the tapered shape of the pocket 12. In such a configuration, the mouth 12m of the pocket 12 can be polygonal shaped instead of being shaped as a circle or oval.

Each of the cutting devices 9 can also include a plurality of inserts 11 that can be comprised of a material that is harder than the material of the body 10. For instance, the material of the inserts 11 can be harder than the steel of the body 10. In some embodiments, the inserts 11 can be comprised of a ceramic material, carbide, polycrystalline diamond (PCD) or tungsten carbide, for example. Each of the inserts 11 can have a shape so an inner portion 11b of the insert has a shape that corresponds to the shape of the pocket 12 to which it is to be inserted for attachment within the pocket 12. Each of the inserts 11 can include an outer portion 11p that extends from out of the body 10 to engage with earth to cut the earth. The outer portion 11p can have a distal end 11d.

For example, each insert 11 can include an outer portion 11p that projects outwardly, away from the body 10 and an inner portion 11b that is sized to be positioned in a respective pocket 12 defined in the body 10 so that a sidewall 11w extending from an inner end 11e of the insert toward its distal end 11d extends along a linearly extending sidewall 12c of the pocket 12 that extends from the pocket bottom 12b to the outer end of the pocket 12a, which can define the mouth 12m of the pocket 12.

The body of the insert 11 can be sized so that the inner end 11e of the insert 11 is positioned within the pocket 12 adjacent the pocket bottom 12b such that there is a gap 12d between the pocket bottom 12b and the inner end 11e of the insert 11. This gap 12d can be sized to facilitate a release of gas that can occur from the insertion of the insert 11 that may occur when the inserts 11 are positioned into their respective pockets 12.

In some embodiments, each of the inserts 11 can be positioned in a respective pocket 12 for being brazed therein for attachment to the body 10 within the pocket 12. Such brazing can include utilization of a brazing material along the pocket sidewall(s) 12c so that a joint can be formed at an interface 15 between the insert wall 11w within the pocket 12 and the portion of the body 10 defining the pocket sidewall(s) 12c.

In some embodiments, a flux can be applied to each insert 11 before it is inserted into a respective pocket 12. The flux can help increase wettability of the brazing material so that a larger surface area of the insert may have the brazing material more uniformly applied thereon. The gap 12d can be sized to facilitate an escape of gas that may occur during the brazing process.

In other embodiments, the brazing material may not be needed or utilized. Instead, each insert 11 can be shrink fit within a respective pocket 12 by the body 10 clamping the insert 11 within the pocket 12 after the insert is positioned in the pocket and the body 10 and insert 11 are subsequently cooled to form the cutting device 9 for attachment at the interface 15 at which the pocket sidewall(s) 12c contacts the insert sidewall(s) 11w.

In some embodiments, each of the cutting devices 9 can be structured to be attached to the first end 5 of the shaft 3 of a cutting tool 1. Each of the cutting devices 9 can include a body 10 having a top side 10c and a bottom side 10d that is opposite the top side 10c. The bottom side 10d can be positioned adjacent to the first end 5 of the shaft 3 and the top side 10c can be further away from the first end 5 of the shaft 3 than the bottom side 10d.

The body 10 can also have plurality of sidewalls that extend between the bottom side 10d and the top side 10c. These sidewalls can include the first end wall 10e and the second end wall 10f that is opposite the first end wall 10e. The first end wall 10e can extend from a first end of the bottom side 10d to a first end of the top side 10c and the second end wall 10f can extend from a second end of the bottom side 10d to a second end of the top side 10c.

The plurality of sidewalls of the body 10 can also include an outer peripheral side facing sidewall 10a and an inner peripheral side facing sidewall 10b. The outer peripheral side facing sidewall 10a can extend between the top side 10c and the bottom side 10d of the body 10 and can also extend between the first end wall 10e and the second end wall 10f. The inner peripheral side facing sidewall 10b can be opposite the outer peripheral side facing sidewall 10a. The inner peripheral side facing sidewall 10a can extend between the top side 10c and the bottom side 10d of the body 10 and also extend between the first end wall 10e and the second end wall 10f.

The body can have plurality of pockets 12 defined therein. The plurality of pockets 12 can include at least one first pocket 12, at least one second pocket 12, and at least one third pocket 12. Each of the pockets 12 can be defined to have a mouth 12m in an outer surface 10o of the body 10, a bottom 12b defined inside the body 10, and at least one pocket sidewall 12c extending linearly and continuously from the bottom 12b of the pocket 12 to the mouth 12m of the pocket 12 at a pre-selected angle such that the mouth 12m of the pocket is wider than the bottom of the pocket 12b.

The top side 10c of the body can have at least one first pocket 12 defined therein, the outer peripheral side facing sidewall 10a can have the at least one second pocket 12 defined therein, and the inner peripheral side facing sidewall 10b can have the at least one third pocket 12 defined therein.

A plurality of inserts 11 can include at least one first insert 11 having an inner portion 11b affixed within the at least one first pocket 12 and an outer portion 11p extending from the at least one first pocket 12, at least one second insert having an inner portion 11b affixed within the at least one second pocket 12 and an outer portion 11p extending from the at least one second pocket 12, and at least one third insert 11 having an inner portion 11b affixed within the at least one third pocket 12 and an outer portion 11p extending from the at least one third pocket 12.

The outer portion 11p of the first insert 11 can be wider than the inner portion 11b of the first insert 11, the outer portion 11p of the second insert 11 can be wider than the inner portion 11b of the second insert 11, and the outer portion 11p of the third insert 11 is wider than the inner portion 11b of the third insert 11.

The numbers of pockets 12 and inserts 11 can be any of a number of suitable different arrangements in different embodiments. In some configurations, there can be a plurality of first inserts 11 positioned in respective first pockets 12 of a plurality of first pockets defined in the top surface 10c. There can also be a plurality of second inserts 11 positioned in respective second pockets 12 of a plurality of second pockets defined in the outer peripheral side facing sidewall 10a. There can also be a plurality of third inserts 11 positioned in respective third pockets 12 of a plurality of third pockets defined in the inner peripheral side facing sidewall 10b. Each of the inserts 11 can have at least one sidewall 11w that extends from an inner end 11e of the insert 11 to the mouth 12m of the pocket 12 in which the insert 11 is positioned along the at least one sidewall 12c of the pocket 12 in which the insert 11 is positioned for being affixed within the pocket 12 to which the insert 11 is positioned.

In some embodiments, a joint can be defined between at least one sidewall 11w of the insert 11 that extends from the inner end 11e of the insert 11 to the mouth 12m of the pocket 12 in which the insert 11 is positioned and the at least one sidewall 12c of the pocket 12 in which the insert 11 is positioned. The joint can include a brazing material, for example. In other embodiments, no such joint may be formed at the interface 15 between the at least one sidewall 11w of the insert 11 and the at least one sidewall 12c of the pocket 12 in which that insert 11 is positioned and the pocket sidewall 12c can directly contact the at least one sidewall 11w of the insert 11 for affixation of the insert 11 within the pocket 12.

Each of the of the inserts 11 can have at least one sidewall 11w that extends from an inner end 11e of the insert 11 to the mouth 12m of the pocket 12 in which the insert 11 is positioned at a pre-selected angle (e.g. an angle of between 10° and 60° or 15° and 45°, etc.).

In some embodiments, the body 10 can be configured to have the pockets 12 for receipt of the inserts 11 to maximize material between all the different pockets 12. Embodiments can be configured so that pocket locations are defined in the body 10 such that material between the immediately adjacent pockets 12 defined in the body was maximized to account for the geometry of the body and sizing of the inserts 11 to be utilized. Other embodiments may utilize other types of geometries, pocket spacing, and insert configurations.

Figure 6:
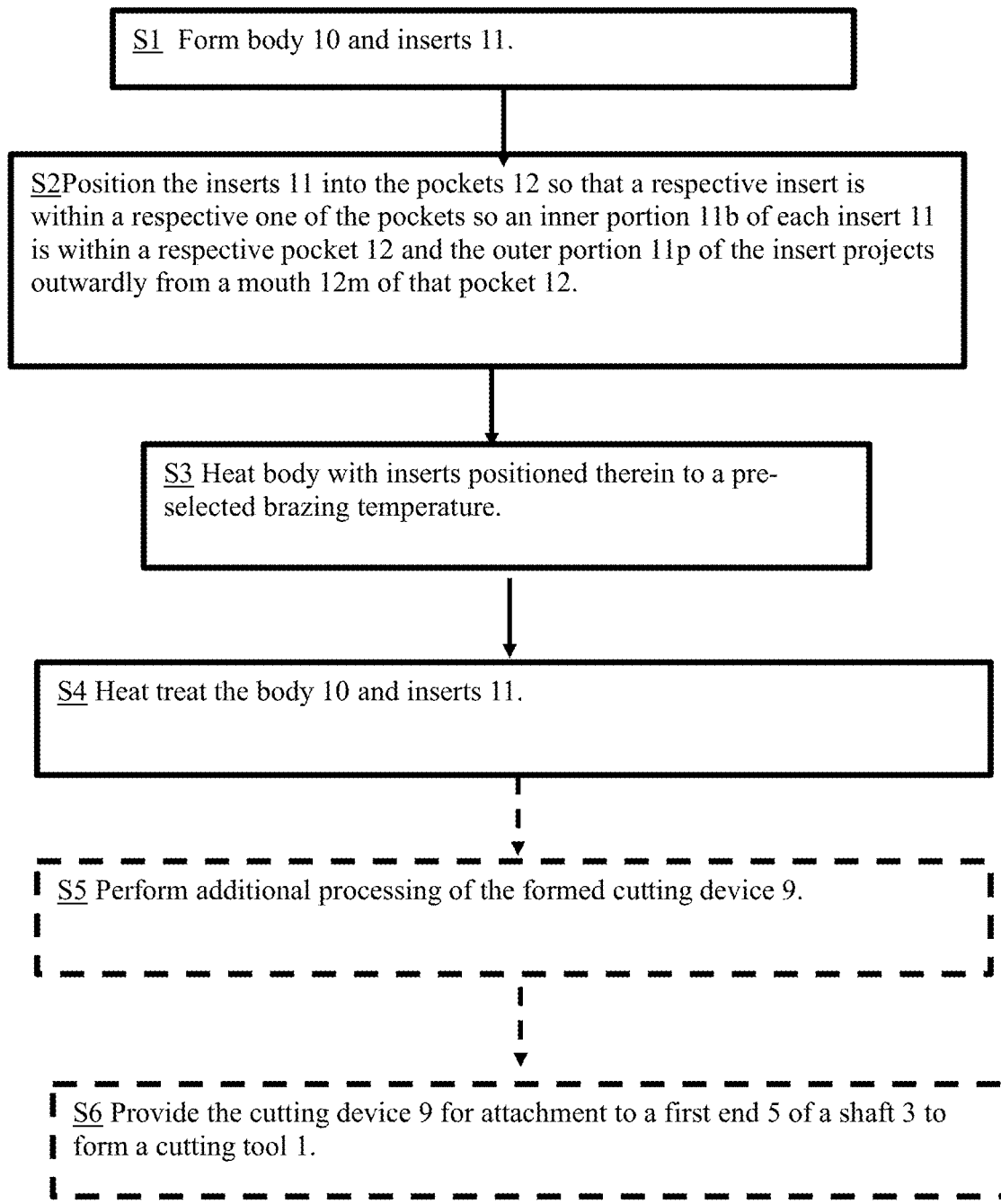
FIG. 6 is a flow chart illustrating an exemplary process for making an exemplary embodiment of the earth cutting device.

Referring to FIG. 6, an exemplary embodiment of a process for making a cutting device 9 is illustrated. An embodiment of the process can be utilized to form an exemplary embodiment of the cutting device 9.

In a first step S1, a body 10 can be formed and inserts 11 can be formed. The body 10 can be formed from steel and the inserts 11 can be formed from a ceramic material, a carbide, PCD, or tungsten carbide material, for example. The formation of the steel body 10 can include forging and/or machining. For example, the body 10 can be formed from steel and the body 10 can subsequently be machined to a desired shape and to also include the desired number of pockets 12. The inserts 11 can be formed from a material that is harder than the material of the body 10.

In some embodiments, the body 10 can be molded to include the tapered pockets 12 therein. In other embodiments, the pockets 12 can be defined in the body 10 via machining or drilling that may occur after the structure of the body if formed from steel or other suitable metal.

The formation of the inserts 11 can be provided via molding and/or machining as well. In some embodiments, the inserts 11 can be formed via molding of the inserts to have a desired shape. In some embodiments, the inserts 11 can be machined to a desired shape after the body of the inserts are molded.

The forming of the inserts 11 and the body 10 can occur at the same time using different manufacturing lines in some embodiments. In other embodiments, the inserts 11 can be formed at a different time than the body 10 and these components can be subsequently positioned near each other for inclusion of the inserts 11 into the steel body 10 at a later time in accordance with a pre-selected manufacturing schedule or other desired schedule for making of a cutting device 9.

In a second step S2, each of the inserts 11 can be positioned in a respective one of the pockets 12 defined in the body 10. Each insert 11 can be positioned so that an inner portion 11b of each insert is within a respective pocket 12 and an outer portion 11p of the insert 11 extends from the mouth 12m of the pocket 12 in which it is positioned. In some embodiments, a brazing material can be applied to the sidewall(s) 11w of the insert 11 and/or the sidewall(s) 12c of the pocket 12 to facilitate attachment of the insert 11 to the body 10 within the pocket 12 via the interface between the sidewall(s) 12c of the pocket 12 and sidewall(s) 11w of the insert 11. This can occur prior to the inserts 11 being positioned in the pockets 12, for example. The insertion of the inserts 11 into the pockets 12 of the body 10 can all occur simultaneously at the same time or may occur in a sequence of insertion steps.

In a third step S3, the body 10 having the inserts 11 positioned in the pockets 12 can be heated to a pre-selected brazing temperature. The pre-selected brazing temperature can be a temperature that is between 300° C. and 500° C. or other suitable temperature. The pre-selected brazing temperature can be a suitable temperature in some embodiments, for example. The heating that is applied can facilitate heating of the brazing material for forming of a joint in some embodiments in which brazing material is utilized.

After each of the inserts 11 is positioned within a respective one of the pockets 12, the body 10 having the inserts 11 can be maintained at the pre-selected insert brazing temperature or other temperature for a pre-selected holding time period. Such a time period can be between 2 minutes and 60 minutes, 5 minutes and 30 minutes, or other suitable time period. Alternatively, no such holding time period may be needed.

In a fourth step S4, the body 10 having the inserts 11 can undergo heat treatment. The heat treatment can be applied to assist in formation of a joint or attachment of the inserts 11 within the pockets 12. For example, after the brazing material is liquified via heating, the body 10 having the inserts 11 can undergo heat treatment to cool the body 10, brazing material, and inserts. In embodiments that may not utilize brazing material, the heat treatment can cool the inserts 11 and body 10 for attachment of the inserts 11 into the pockets 12 of the body 10.

For example, the body 10 having the inserts 11 can be quickly cooled via quenching or can undergo cooling via other type of heat treatment processing. For instance, after the insertion of the inserts 11 and the heating of the body having the inserts positioned therein, the entire cutting device 9 can be rapidly cooled via quenching in a bath that retains a quenching liquid (e.g. an oil, a quenching fluid that can include oil and other additives, another type of quenching liquid). The quenching liquid can be at a pre-selected quenching liquid temperature to provide rapid cooling of the body 10 and inserts 11 (e.g. ambient temperature or at another temperature that is significantly cooler than the temperature of the steel body 10). The positioning of the body 10 having the inserts 11 into the bath retaining the quenching liquid can occur so that the entire body 10 and inserts 11 is fully submerged within the quenching liquid inside the bath for a pre-selected quenching time period (e.g. five minutes, ten minutes, a time that is between greater than 0 seconds and 20 minutes, etc.).

The heat treatment processing in some embodiments may not utilize quenching. Instead, another type of heat treatment processing may be utilized. As yet another alternative, the quenching can be utilized in addition to other post brazing heat treatment processing.

The cooling of the steel body 10 and the inserts 11 of the cutting device 9 may occur via full insertion into the quenching liquid or other heat treatment processing such that the steel body 10 and inserts 11 shrink at different rates due to the significantly different coefficients of thermal expansion of the different materials of the inserts 11 and body 10. Cracking due to this shrinking of the inserts 11 and the body 10 at different rates can be avoided due to the thickness of the inner core 10*i* of material present in the body 10 between the different pockets 12, which can be provided via the size and shape of the tapered pockets 12 and corresponding shaped cutting inserts 11.

After the heat treatment, additional process steps can be performed. For example, in a fifth step S5 (shown in broken line), post-heat treatment processing of the formed cutting device 9 can be performed. This can include post-quench heat treatment, polishing, machining, and/or packaging of the cutting device 9 for shipment to a customer who may install the cutting device 9 onto a first end 5 of a shaft 3 of a cutting tool 1.

As another example, in a sixth step S6, the cutting device 9 can be provided for attachment to a first end 5 of the shaft 3 of a cutting tool 1. A plurality of the cutting devices 9 can be formed and provided for attachment to different locations along a perimeter of the first end 5 of the shaft 3 for attachment to the shaft to provide cutting of earth in the first, second, and third cutting directions C1, C2, and C3, for example.

Embodiments of the formed cutting device 9 that can be formed via an exemplary embodiment of the process shown in FIG. 6 can include an above noted embodiment of the cutting device 9. Embodiments of the cutting device 9 that are formed can be configured for attachment to a rotatable shaft 3 of a cutting tool 1.

We have surprisingly found that embodiments of the cutting device 9 can permit a more reliable manufacture of a higher quality cutting device 9. Embodiments can provide a stronger connection between the inserts 11 and the body 10 to provide a cutting device 9 that can have an improved life and durability. Also, we have found that manufacturing of embodiments of the cutting device 9 can be performed more reliably and efficiently with less loss of material and less waste due to the avoidance of cracking during quenching.

It should be appreciated that the exemplary embodiments discussed herein can be adjusted to account for a particular set of design criteria. For example, the size of the steel body 10, the size and shape of inserts 11, the size and shape of pockets 12, and the type of material utilized for the inserts and the body can be any of a number of different options. For instance, the type of steel utilized for the body 10 and the type of insert material used for the inserts (e.g. a ceramic material, carbide, PCD, tungsten carbide, etc.) can be any of a number of suitable different grades or other options. As another example, the shape of the projecting upper portion of the inserts 11 can be any type of suitable shape to facilitate a desired cutting profile for the cutting device 9. Thus, while certain present preferred embodiments of the apparatus (e.g. cutting tool 1, and/or cutting device 9) and embodiments of methods for making and using the same have been shown and described above, it is to be distinctly understood that the invention is not limited thereto but may be otherwise variously embodied and practiced within the scope of the following claims.

What is claimed is:

1. A cutting tool comprising:
a shaft having a first end and a second end, the shaft being rotatable in a first rotational direction;
a plurality of cutting devices attached to the first end of the shaft, each of the cutting devices including:
a body having a top side and a bottom side, the top side being opposite the bottom side, the bottom side being positioned adjacent to the first end of the shaft and the top side being further away from the first end of the shaft than the bottom side;
the body also having a plurality of sidewalls that extend between the bottom side and the top side, the plurality of sidewalls including a first end wall and a second end wall that is opposite the first end wall, the first end wall extending from a first end of the bottom side to a first end of the top side, the second end wall extending from a second end of the bottom side to a second end of the top side;
the plurality of sidewalls of the body also including an outer peripheral side facing sidewall and an inner peripheral side facing sidewall, the outer peripheral side facing sidewall extending between the top side and the bottom side and also extending between the first end wall and the second end wall, the inner peripheral side facing sidewall being opposite the outer peripheral side facing sidewall, the inner peripheral side facing sidewall extending between the top side and the bottom side and also extending between the first end wall and the second end wall;
the body having a plurality of pockets defined therein, the plurality of pockets including at least one first pocket, at least one second pocket, and at least one third pocket, each of the pockets being defined to have a mouth in an outer surface of the body, a bottom defined inside the body, and at least one pocket sidewall extending linearly and continuously from the bottom of the pocket to the mouth of the pocket at a pre-selected angle such that the mouth of the pocket is wider than the bottom of the pocket;
the top side having the at least one first pocket defined therein,
the outer peripheral side facing sidewall having the at least one second pocket defined therein;
the inner peripheral side facing sidewall having the at least one third pocket defined therein;
a plurality of inserts including at least one first insert having an inner portion affixed within the at least one first pocket and an outer portion extending from the at least one first pocket, at least one second insert having an inner portion affixed within the at least one second pocket and an outer portion extending from the at least one second pocket, and at least one third insert having an inner portion affixed within the at least one third pocket and an outer portion extending from the at least one third pocket.

2. The cutting tool of claim 1, wherein the outer portion of the first insert is wider than the inner portion of the first insert, the outer portion of the second insert is wider than the inner portion of the second insert, and the outer portion of the third insert is wider than the inner portion of the third insert.

3. The cutting tool of claim 2, wherein the shaft has a chamber in communication with a mouth defined in the first end of the shaft.

4. The cutting tool of claim 1, wherein each of the inserts has at least one sidewall that extends from an inner end of the insert to the mouth of the pocket in which the insert is positioned along the at least one pocket sidewall of the pocket in which the insert is positioned for being affixed within the pocket to which the insert is positioned.

5. The cutting tool of claim 4, wherein for each of the inserts, a joint is defined between the at least one sidewall of the insert that extends from the inner end of the insert to the mouth of the pocket in which the insert is positioned and the at least one pocket sidewall of the pocket in which the insert is positioned, wherein the joint includes a brazing material, and wherein for each of the at least one pocket, there is a gap between the inner end of the insert positioned within the pocket and a bottom of the pocket.

6. The cutting tool of claim 4, wherein each of the of the inserts has at least one sidewall that extends from the inner end of the insert to the mouth of the pocket in which the insert is positioned at the pre-selected angle, the pre-selected angle being between 10° and 60°.

7. The cutting tool of claim 4, wherein the first end wall has no inserts and the second end wall has no inserts.

8. A cutting device for being connected to a distal end of a rotatable shaft of an earth cutting tool, the cutting device comprising:
a body comprised of metal, the body having a top side and a bottom side, the top side being opposite the bottom side, the bottom side being positionable adjacent to the distal end of the rotatable shaft;
the body also having a plurality of sidewalls that extend between the bottom side and the top side, the plurality of sidewalls including a first end wall and a second end wall that is opposite the first end wall, the first end wall extending from a first end of the bottom side to a first end of the top side, the second end wall extending from a second end of the bottom side to a second end of the top side;
the plurality of sidewalls of the body also including an outer peripheral side facing sidewall and an inner peripheral side facing sidewall, the outer peripheral side facing sidewall extending between the top side and the bottom side and also extending between the first end wall and the second end wall, the inner peripheral side facing sidewall being opposite the outer peripheral side facing sidewall, the inner peripheral side facing sidewall extending between the top side and the bottom side and also extending between the first end wall and the second end wall;
the body having a plurality of pockets defined therein, the plurality of pockets including at least one first pocket, at least one second pocket, and at least one third pocket, each of the pockets being defined to have a mouth in an outer surface of the body, a bottom defined inside the body, and at least one pocket sidewall extending linearly and continuously from the bottom of the pocket to the mouth of the pocket at a pre-selected angle such that the mouth of the pocket is wider than the bottom of the pocket;
the top side having the at least one first pocket defined therein,
the outer peripheral side facing sidewall having the at least one second pocket defined therein;
the inner peripheral side facing sidewall having the at least one third pocket defined therein;
a plurality of inserts comprised of a material that has a different coefficient of thermal expansion than a coefficient of thermal expansion of the metal of the body, the plurality of inserts including at least one first insert having an inner portion affixed within the at least one first pocket and an outer portion extending from the at least one first pocket, at least one second insert having an inner portion affixed within the at least one second pocket and an outer portion extending from the at least one second pocket, and at least one third insert having an inner portion affixed within the at least one third pocket and an outer portion extending from the at least one third pocket.

9. The cutting device of claim 8, wherein each of the inserts has at least one sidewall that extends from an inner end of the insert to the mouth of the pocket in which the insert is positioned along the at least one pocket sidewall of the pocket in which the insert is positioned for being affixed within the pocket to which the insert is positioned; and
wherein the pre-selected angle is between 10° and 60°.

10. The cutting device of claim 8, wherein for each of the pockets, there is a gap between the bottom of the pocket and an inner end of the insert positioned in the pocket.

11. A method of forming a cutting device, the method comprising:
providing a body comprised of metal, the body having a top side opposite a bottom side, an outer peripheral facing sidewall extending from the bottom side to the top side, and an inner peripheral side facing sidewall opposite the outer peripheral facing sidewall, the inner peripheral side facing sidewall extending from the bottom side to the top side, the body having a plurality of pockets, the plurality of pockets including at least one first pocket defined in the top side of the body, at least one second pocket defined in the outer peripheral side facing sidewall, and at least one third pocket defined in the inner peripheral side facing sidewall, each of the pockets having a bottom, a mouth defined in an outer surface of the body, and at least one sidewall extending linearly from the bottom of the pocket to the mouth of the pocket at a pre-selected angle such that the mouth of the pocket is wider than the bottom of the pocket;
positioning inserts into the pockets of the body such that the an inner end of each insert is spaced apart from the bottom of the pocket into which the insert is positioned and at least one sidewall of the insert extends from the inner end of the insert along the at least one sidewall of the pocket to the mouth of the pocket, and an outer portion of the insert extends away from the body, the insert comprised of a material having a coefficient of thermal expansion that is different than a coefficient of thermal expansion of the metal of the body;
applying a brazing material onto the inserts and/or into the pockets before the inserts are positioned into the pockets,
heating the body having the inserts positioned in the pockets to a pre-selected brazing temperature, and
applying a heat treatment to the body having the inserts positioned within the pockets to form the cutting device.

12. The method of claim 11, wherein the inserts are comprised of a ceramic material, carbide, polycrystalline diamond, or tungsten carbide.

13. The method of claim 11, wherein the pre-selected angle is between 10° and 60°.

14. The method of claim 11, wherein the applying of the heat treatment to the body having the inserts positioned within the pockets to form the cutting device includes positioning the body having the inserts positioned within the pockets into a quenching liquid retained in a bath to quench the body and the inserts for a pre-selected quenching time period.

15. The method of claim 14, wherein the pockets are sized and configured to prevent cracking when the body having the inserts positioned within the pockets is positioned in the quenching liquid for the pre-selected quenching time period.

16. The method of claim 14, wherein the body having the inserts positioned within the pockets is moved into the quenching liquid to solidify a brazing of the body and the inserts to retain the inserts within the pockets.

17. The method of claim 11, wherein the positioning of the inserts in the pockets is performed so that for each of the inserts that is positioned into a respective one of the pockets, a joint is formed at an interface between the at least one sidewall of the insert and the at least one sidewall of the pocket.

18. The method of claim 11, wherein the applying of the heat treatment to the body having the inserts positioned within the pockets to form the cutting device includes cooling the body having the inserts positioned within the pockets; and
   wherein the pockets are defined in the body to prevent cracking when the body having the inserts positioned within the pockets is cooled via the applying of the heat treatment.

* * * * *